US007685576B2

(12) United States Patent
Hartmann et al.

(10) Patent No.: US 7,685,576 B2
(45) Date of Patent: Mar. 23, 2010

(54) SYSTEM AND METHOD FOR MODEL BASED SYSTEM TESTING OF INTERACTIVE APPLICATIONS

(75) Inventors: Jean Hartmann, Redmond, WA (US); Herbert R. Foster, Jr., Princeton, NJ (US); Marlon E. R. Vieira, East Windsor, NJ (US); Axel Ruder, Plainsboro, NJ (US)

(73) Assignee: Siemens Corporation, Princeton, NJ (US)

( * ) Notice: Subject to any disclaimer, the term of this patent is extended or adjusted under 35 U.S.C. 154(b) by 1078 days.

(21) Appl. No.: 11/040,571

(22) Filed: Jan. 21, 2005

(65) Prior Publication Data

US 2005/0256665 A1 Nov. 17, 2005

Related U.S. Application Data

(60) Provisional application No. 60/539,231, filed on Jan. 26, 2004.

(51) Int. Cl.
*G06F 9/44* (2006.01)
(52) U.S. Cl. ................... 717/132; 717/105; 717/125
(58) Field of Classification Search ............. 702/377, 702/73, 108; 714/38, 100, 25; 717/124, 717/100; 712/220, 227
See application file for complete search history.

(56) References Cited

U.S. PATENT DOCUMENTS

| 6,473,794 | B1 * | 10/2002 | Guheen et al. | 709/223 |
| 6,505,342 | B1 * | 1/2003 | Hartmann et al. | 717/104 |
| 2002/0059039 | A1 * | 5/2002 | Friedman et al. | 702/119 |
| 2002/0091990 | A1 * | 7/2002 | Little et al. | 717/105 |

OTHER PUBLICATIONS

"UML-Based Integration Testing", Imoberdorf et al., Dec. 2000, pp. 60-70. Online retrieved at <http://delivery.acm.org/10.1145/350000/348872/p60-hartmann.pdf>.*
"A simulation-based approach to software performance modeling", Balsamo et al., Sep. 2003, pp. 363-366. Online retrieved at <http://delivery.acm.org/10.1145/950000/940122/p363-balsamo.pdf>.*
"Performance analysis of time-enhanced UML diagrams based on stochastic processes", Lindemann et al., Jul. 2002, pp. 25-34. Online retrieved at <http://delivery.acm.org/10.1145/590000/584375/p25-lindemann.pdf>.*

(Continued)

*Primary Examiner*—Tuan Q Dam
*Assistant Examiner*—Thuy Dao
(74) *Attorney, Agent, or Firm*—Donald B. Paschburg; F. Chau & Associates, LLC

(57) ABSTRACT

A method and device with instructions for testing a software application include creating a system model for the software application, wherein the system model includes an activity diagram, and applying one or more test annotations to the activity diagram to control test generation for testing the software application. Further, test annotations and the system model are processed to create one or more test cases, and the software application is tested using a test execution tool that uses the test cases.

19 Claims, 8 Drawing Sheets

OTHER PUBLICATIONS

"A qualitative assessment of the efficacy of UML diagrams as a form of graphical documentation in aiding program understanding", Tilley et al., Oct. 2003, pp. 184-191. Online retrieved at <http://delivery.acm.org/10.1145/950000/944908/p184-tilley.pdf>.*

"Automated-generating test case using UML statechart diagrams", Kansomkeat et al., Sep. 2003, pp. 296-300. Online retrieved at <http://delivery.acm.org/10.1145/960000/954046/p296-kansomkeat.pdf>.*

* cited by examiner

```
Test name="CancelEncounter_SystemTest_5"
  Preconditions
  {
    1.  A valid user is logged into the system.
    2.  An encounter status has been identified
    3.  Context of the encounter is known
  }
  Choice "EncounterStatus" = "Attended"
  Choice "ServicesAttached" = "False"
  Choice "ExistingServicesProfileOption" = "error"          /102
      UserAction          "InvokeCancellation"
      SystemResponse  "PresentEncounterInformation"
      SystemResponse  "PresentCancellationForm"
      UserAction          "EnterCancelDate"
  Choice "CancellationDateAfterEncounterStart"="F"
  Choice "TimeframeExpired"="T"
  Choice "InvalidDate"="F"
      UserAction          "EnterCancellationReason"
      UserAction          "EnterResultingStatus"
  Choice "ResultingStatus" ="Scheduled"
      UserAction          "EnterNewDate"
      UserAction          "IndicateComplete"
  Choice "IndicateComplete_cancel" = "F"
      SystemResponse  "ValidateEntries"
      SystemResponse  "PresentTimeframeExpiredMessage"
      UserAction          "TimeFrameExpiredConfirm"
  Choice "TimeFrameExpiredConfirm...No" = "F"
      SystemResponse  "PromptVerifyCompletion"
      UserAction          "IndicateCompletion"
  Choice "IndicateCompletion_NotDoneYet" = "F"
      SystemResponse  "Validate_Encounter_Dates"
      SystemResponse  "Print_Artifacts"
      SystemResponse  "ValueCancellationType"
      SystemResponse  "ManageSecEncounterLinksNecessary"
      SystemResponse  "UpdateEncounterWithAssociations"
      SystemResponse  "NotifyEffectedApplications"
      SystemResponse  "GenerateCancellationNoticeDocument"
      SystemResponse  "NotifyinterestedPartiesOfCheckinCancellation"
      SystemResponse  "NotifyActorCancellationComplete"
  Postcondition
  {
    1.  The encounter is updated to a cancelled or
        scheduled status.
    2.  All effected associations to the encounter are
        updated
    3.  All appropriate notifications are generated
    4.  The Cancel Check-In Event is published.
  }
```

FIG. 7

```
Function RunTests ()
    StartRun      'Must be the first executable statement        110
      StartTest      "CancelEncounter_SystemTest_5"
        SetTestParm     "EncounterStatus" , "Attended"
        SetTestParm     "ServicesAttached" , "False"
        SetTestParm     "ExistingServicesProfileOption", "error"
          RunStep       "InvokeCancellation" , ""
          VerifyStep    "PresentEncounterInformation", ""
          VerifyStep    "PresentCancellationForm", ""
          RunStep       "EnterCancelDate", ""
        SetTestParm     "CancellationDateAfterEncounterStart", "F"
        SetTestParm     "TimeframeExpired" , "T"
        SetTestParm     "InvalidDate",  "F"
          RunStep       "EnterCancellationReason", ""
          RunStep       "EnterResultingStatus", ""
        SetTestParm     "ResultingStatus" , "Scheduled"
          RunStep       "EnterNewDate" , ""
          RunStep       "IndicateComplete", ""
        SetTestParm     "IndicateComplete_cancel" , "F"
          VerifyStep    "ValidateEntries" , ""
          VerifyStep    "PresentTimeframeExpiredMessage" , ""
          RunStep       "TimeFrameExpiredConfirm" , ""
        SetTestParm     "TimeFrameExpiredConfirm_No" , "F"
          VerifyStep    "PromptVerifyCompletion" , ""
          RunStep       "IndicateCompletion" , ""
        SetTestParm     "IndicateCompletion_NotDoneYet" < "F"
          VerifyStep    "Validate_Encounter_Dates" , ""
          VerifyStep    "Print_Artifacts" , ""
          VerifyStep    "ValueCancellationType" , ""
          VerifyStep    "ManageSecEncounterLinksNecessary" , ""
          VerifyStep    "UpdateEncounterWithAssociations" , ""
          VerifyStep    "NotifyEffectedApplications" , ""
          VerifyStep    "GenerateCancellationNoticeDocument" , ""
          VerifyStep    "NotifyInterestedPartiesOfCheckInCancellation" , ""
          VerifyStep    "NotifyActorCancellationComplete" , ""
        RunStep    "Logoff" , ""
      EndTest
    End Run
End Function
```

FIG. 8

SYSTEM AND METHOD FOR MODEL BASED SYSTEM TESTING OF INTERACTIVE APPLICATIONS

CROSS-REFERENCE TO RELATED APPLICATION

This application claims the benefit of U.S. Provisional Application No. 60/539,231 filed on Jan. 26, 2004, titled as "A Model-Based Approach to Improve System Testing of Interactive Applications", contents of which are incorporated herein by reference.

TECHNICAL FIELD

The present invention generally relates to testing procedures for software applications and more particularly to model based testing of interactive software applications.

DISCUSSION OF THE RELATED ART

Testing software applications is a necessary part of software development process to ensure their functional and operational validity. The nature of software development process more often than not introduces design, execution and semantic errors (also called "software bugs") into the software code being developed. Such software errors are likely to multiply when large teams of developers are working together to develop a software project. Hence, there is a need for developing techniques to minimize software errors before the code is used by end-users.

Software testing has become an integral part of the software development process. Automated testing tools provide some benefits by allowing large number of tests to be performed on the software code. However, testing Graphical User Interface (GUI) based software becomes complex even with the use of automated testing tools.

Software testing is typically relegated to the later stages of the software development cycle. Software testing can be made more effective when testing concerns are addressed during the design phase of the software development cycle. Hence, there is a need for technique(s) that would allow software testing to be integrated with the design phase. Further, such integrated testing should be usable with existing testing and design tools without any need to re-design or re-develop the tools.

System testing ensures the functional compliance of an application with its design requirements/goals. System testing remains a largely manual process. Test designers typically derive their test related design information, which includes the required system input and expected output, from multiple sources such as textual use case specification and business rules. Then, the testing personnel carry out test steps manually when automated tools are not used. Alternately, if automated testing tools are used, the test designers have to convert the test procedures into executable test scripts that can be executed by the testing tool. However, the test designers have to design tests based on their understanding of the system from use cases and business rules, which do not contain any test specific modeling. Tests designed using such design processes may not fulfill the goal of effective functional testing. Hence, there is a need for a system and test modeling technique(s) that enables the test designers to develop more effective test designs that integrate with the system model.

Different testing approaches are described next. One testing approach as described in the U.S. Pat. No. 6,505,342 to Hartmann et al., entitled "System and method for functional testing of distributed, component-based software", which is commonly owned and incorporated herein by reference in its entirety, performs functional testing of component based software to generate executable test cases. Another approach as described in U.S. Pat. No. 5,913,023 to Szermer, entitled "Method for automated generation of tests for software", which is commonly owned and incorporated herein by reference in its entirety, uses format generative and constraining requirements to generate test cases.

SUMMARY OF THE INVENTION

In one aspect of the invention, a method and device with instructions for testing a software application include creating a system model for the software application, wherein the system model includes an activity diagram, and applying test annotations to the activity diagram to control test generation for testing the software application. Further, test annotations and the system model are processed to create test cases, and the software application is tested using a test execution tool that uses the test cases.

In another aspect of the invention, a system model for the software application is created, wherein the system model includes one or more UML diagrams. TSL (Test Specification Language) categories are created by partitioning input choices for each one of the categories, wherein input choices are sourced from all possible inputs to the software application. Test annotations are applied to the UML diagrams that include activities, variables and transitions. A TSL test design is generated from the UML diagrams and test annotations applied to the UML diagrams by mapping the activities, transitions, variables to the categories. The software application is tested using test cases generated from the TSL test design.

BRIEF DESCRIPTION OF DRAWINGS

Exemplary embodiments of the present invention are described with reference to the accompanying drawings, of which:

FIG. 7 is an illustrative textual test procedure for a test sequence in an exemplary embodiment of the invention;

FIG. 8 shows an illustrative generated test script with calls to the individual test step functions in an exemplary embodiment of the invention.

DETAILED DESCRIPTION OF THE EXEMPLARY EMBODIMENTS

The exemplary embodiments of the present invention will be described with reference to the appended drawings.

Figure 1:
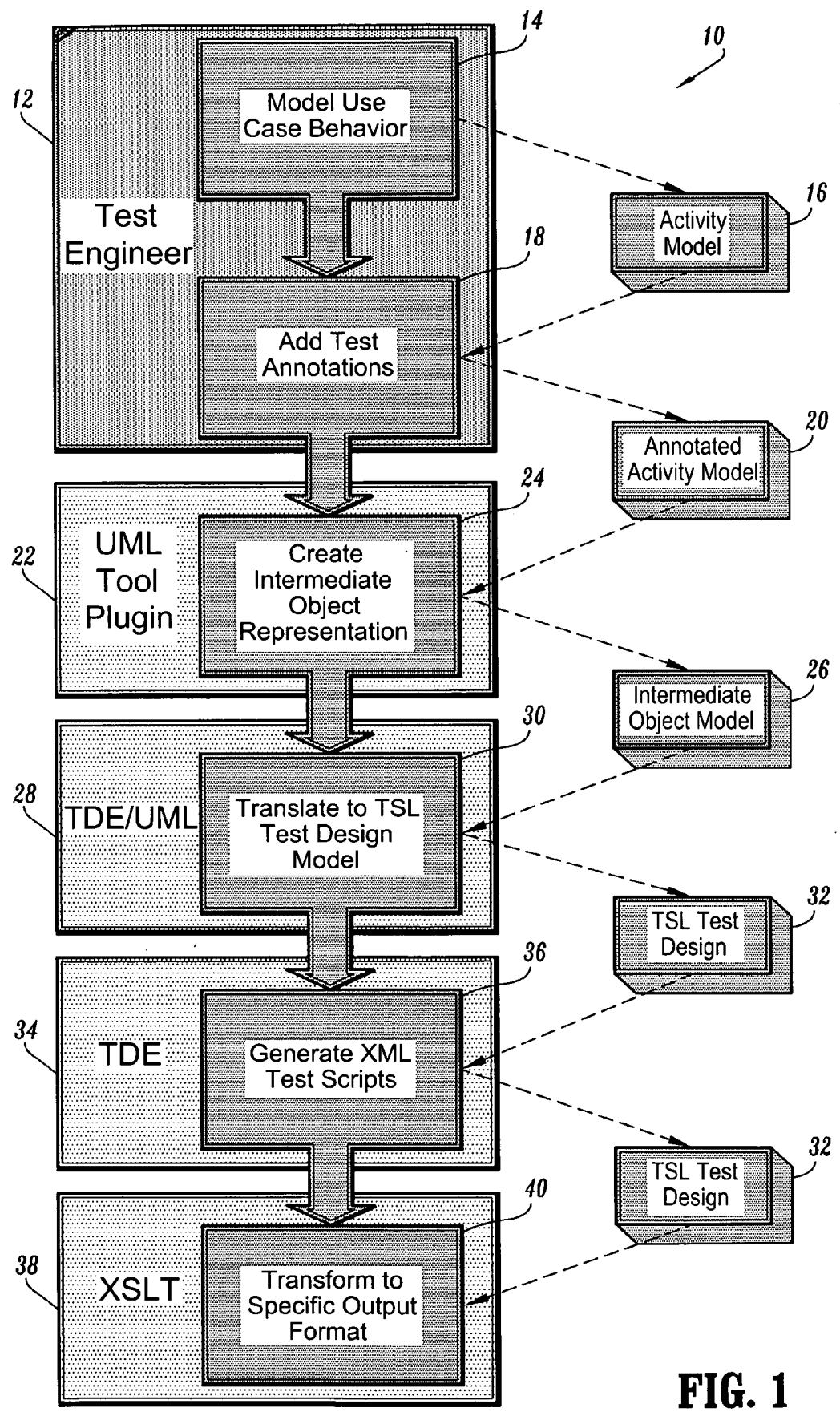
FIG. 1 is a system activity-chart for a software testing cycle according to an exemplary embodiment of the invention.

FIG. 1 is a system activity-chart for a software testing cycle according to an exemplary embodiment of the invention. The activity-chart 10 shows an illustrative test development cycle in at least one embodiment of the invention to build a software model for testing a software application. As shown at a step 14, a test designer/engineer 12 designs use cases (not shown) to define the use case scenarios. A UML design software/tool can be used to model the use cases and add further test annotations. The use cases and associated use case diagrams can be either generated by a tool or designed manually by a user.

The use cases can be employed to define any system functionality. For example, the use cases can be used to define the process of logging into an application. An activity model 16 can be built from the use cases, as shown at the step 14. The activity model 16 includes the use case related information captured through the use cases.

The test designer 12 further adds test annotations (not shown) to the use cases as shown at a step 18. The added test annotations define the testing parameters and test control commands for the test generation tools. The test annotations are in the form of additions to an UML design that is used to create the activity model 16. At the step 18, the test annotations are combined with the use cases to generate an annotated activity model 20. Thus, the annotated activity model 20 captures the testing information at the use case design stage. Thus, the test information is combined with the software model at the earliest possible stage of the software development life cycle, and hence it can be made part of the software design model.

The number of test annotations that need to be added to the UML design is relatively small. In many cases the test designer can rely on the default values used by the test generator for test coverage and test related conditional expressions. Hence, the test designer can focus on the refinement of the diagrams and the definition of data variables, if any.

As shown at a step 24, the UML converter 22 uses the annotated activity model 20 to create intermediate object representations (not shown). The UML converter 22 can be implemented as either a stand-alone tool or as a part of another tool. For example, the UML converter 22 can be a part of the UML design software in a "plugin" like format. Alternatively, the output of the UML design software can be sent as an input to a standalone UML converter 22.

The UML converter 22 reads the UML design and test annotations in the annotated activity model 20. The UML converter 22 then uses the information sourced from the annotated activity model 20 to generate intermediate object representations (not shown), at a step 24. The UML converter 22 generated intermediate object representations are used to create an intermediate object model 26.

A test translator 28 uses the intermediate object model 26 to generate Test Specification Language (TSL) scripts (not shown). The TSL can be any set of rules that are used to specify the testing parameters for the system. The set of rules forming the TSL should be such that they can be processed by a testing software/tool. The TSL scripts can be in the form of text scripts or any another form, for example, an object based test representation.

As shown at a step 30, the test translator 28 uses the intermediate object model 26 to generate the TSL scripts that are used to form a TSL test design 32. A Test Development Environment (TDE) 34 uses the TSL test design 32 to create test scripts in a descriptive form, for example, in extensible Markup Language (XML), as shown at a step 36. As shown at a step 40, an eXtensible Stylesheet Language Template (XSLT) module 38 uses the TSL test design 32 to translate the output of the XML test scripts executed by a testing tool (not shown) to an output format.

Figure 2:
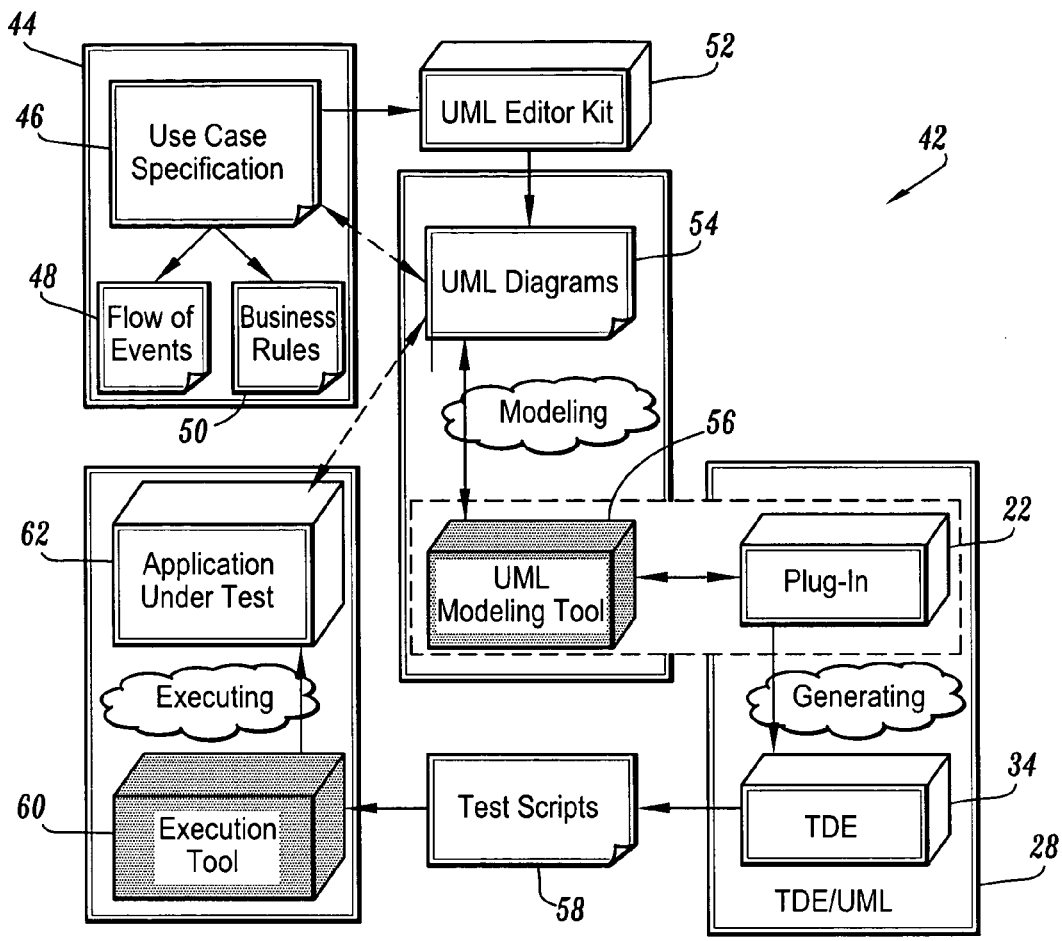
FIG. 2 is a block diagram of a test development and execution system in an exemplary embodiment of the invention.

FIG. 2 is a block diagram of a test development and execution system in an exemplary embodiment of the present invention. The test development and execution system 42 initiates its operation through a use case generation module 44. The use case generation module 44 can be either a manual or an automatic use case generation module. Use case specifications 46 include flow of events description 48 and operational rules 50, which can be business rules in a given business application.

The use case specifications 46 can be edited using a UML editor kit 52 that generates UML diagrams 54. The UML diagrams 54 are modeled into a UML based system description using a UML modeling tool 56. The UML modeling tool 56 can include the UML converter 22 as a plugin. Alternately, the UML converter 22 can be a separate module or a program that can process the UML output of the UML modeling tool 56.

The UML editor kit 52 is required only if an existing set of use case specifications need to be converted into a type that is readable by a UML design tool. Alternately, a user can directly design UML models by using the UML modeling tool 56. The test designers thus have flexibility in converting existing use case specifications into a model that has testing attributes, or design a new UML model that includes test attributes inbuilt from the outset. Further, the test designers can extend existing use cases by modeling them using the UML editor kit 52 and combining them with the newly designed UML models.

The TDE 34 processes the output of the UML converter 22 to generate test scripts 58. An execution tool 60 executes the test scripts 58 over an application 62 that is being tested. Using the set of textual test procedures generated by the TDE 34, the execution tool 60 can start with the capture of a representative set of test scripts using a User Interface (UI) (capture/replay) tool (not shown). The individual test steps are recorded where each test step corresponds to a user activity in the activity diagram. Test steps need to be recorded until all transitions in the UML diagrams have been traversed.

While path verification is handled in each test step by checking whether a proper graphical window is being displayed, additional data verification test steps may need to be created to check that the data fields contain correct values. Alternately, the verification may be performed as part of the original set of test steps. Some test tools allow the capture of so-called 'checkpoints' that can refer to this data. Other tools only capture the data on the screen and require data verification to be performed programmatically by the test executor. For three-tiered applications, database verification is an important consideration and needs to be performed at the end of a specific test sequence. Typically, a set of additional steps is recorded via the GUI in which the data on the screens is checked; and sometimes a separate verification script needs to be called.

A test executor may wish to either just maintain the representative set of test scripts and models or enhance the existing set of scripts by recording additional scripts, which vary only in the data values being entered in the application's input fields, to conserve resources or time. Alternately, the test executor can further create a library of test snippets from the representative set of test scripts to allow the test generator to automatically create those additional tests. The individual test steps need to be refined, i.e., generalized or parameterized, so that they are independently callable from an automatically generated test script and driven using their arguments or the data structures that reference those arguments. The test executor needs to customize the XSL style sheets for the test generator to generate the executable test scripts.

Since the order of test cases that the test generator creates is random, there should be no dependency between the test cases. For example, if one test case cancels an encounter and another stops the cancellation, the encounters for the two test cases must be separate encounters. In order to prevent test dependencies, each test should leave the GUI in the same state as it was at the start of the test. Typically, this means that each test should return to the "Home Page", i.e., the starting point of application, when validating web-based applications or should exit the GUI. Differences between the model and implementation would indicate potential bugs.

The execution tool 60 should have UI testing capabilities including ability to capture and replay the GUI inputs and outputs. In particular, the execution tool 60 must be able to record and play back user actions based on logical objects, and not just screen or window positions. The execution tool 60 must further provide scripting facilities and ability to encapsulate test data to hide details concerning the GUI and database.

While the validation of individual use cases for the system 42 is described above as an illustration, the system 42 also supports the validation of multiple use cases that interact with each other. This enables the test designers to verify that the test and application functionalities are working together as intended.

Figure 3:
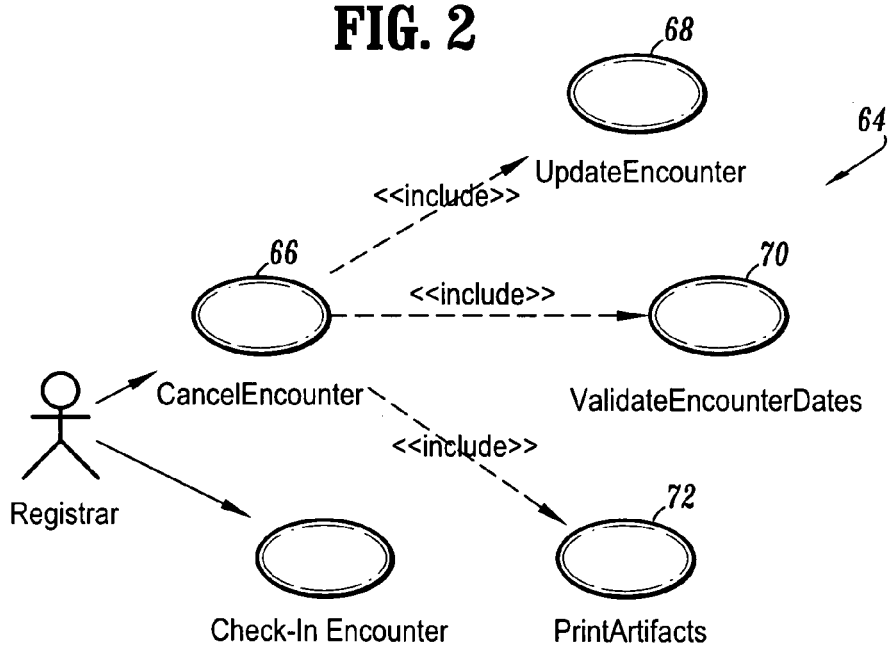
FIG. 3 is a use case diagram showing an illustrative transaction for canceling an action in an exemplary embodiment of the invention.

FIG. 3 is a use case diagram showing an illustrative transaction for canceling an action in an exemplary embodiment of the invention. Generally, use cases are used to capture user requirements for a system in a textual and descriptive form. Use case diagrams represent the use cases in a graphical form. As an illustration, a use case diagram 64 for a "CancelEncounter" use case is shown.

The illustrative use case diagram 64 models the scenarios for a hospital representative who can create and cancel a hospital visit encounter for a patient. A CancelEncounter use case 66 includes the use cases for UpdateEncounter 68 scenario where records for a particular hospital visit in a database can be updated; a ValidateEncounterDates use case 70 where hospital visit dates can be validated; and PrintArtifacts use case 72 that will allow an administrator to print various reports related to patient hospital visits.

Use case diagrams provide a graphical and intuitive technique to represent scenarios in use cases. From a test designers viewpoint, use case diagrams enable capturing the flow of control between a user and the system. As the complexity of use cases increase, the use case diagrams become dense and hard to understand. An alternative in such situation is to create use case specifications that represent use case information in a tabular form. Further, the use case information can be represented as activity diagrams that are described next.

Use case diagrams and activity diagrams can be designed as per the UML standards. Each use case in an use case diagram can be described by an activity diagram, and hence it can be viewed as a sub-diagram of the over all use case diagram. The UML use case diagrams can be used to describe the relationship among the diverse use cases specified for the system and the actors who interact with the system according to those use cases. UML activity diagrams can be used to model the logic captured by a single use case. The set of activity diagrams represents the overall behavior specified for the system and it is the basis for testing the different functionalities and business rules described in the use cases specification.

Activity diagrams are better suited to depict use cases that are specified as series of user action and system response (both activities). Furthermore, activity diagrams cut across the logic of several of the use cases identified in a use case model, describing the order of actions that can occur in the system during a user interaction. The activity diagrams are described next.

Figure 4:
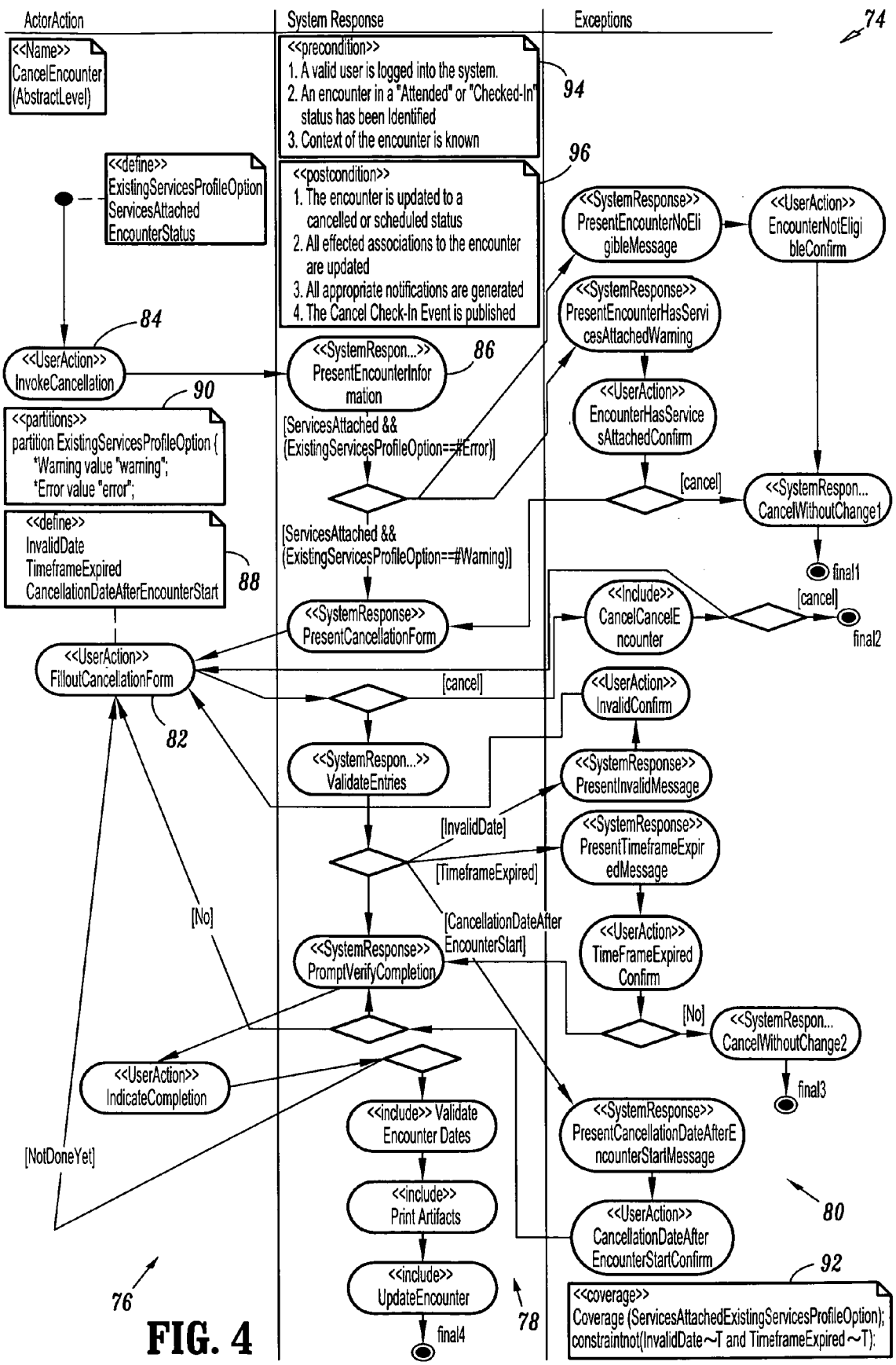
FIG. 4 is an activity diagram representing the CancelEncounter use case in an exemplary embodiment of the invention.

FIG. 4 is an activity diagram representing the CancelEncounter use case in an exemplary embodiment of the present invention. Activity diagrams typically are divided into vertical sections. First two vertical sections on the left side show a test scenario in the use case. The last vertical section depicts alternate situations. Here, the cancelEncounter use case is depicted in the activity diagram 74. The cancelEncounter activity diagram 74 includes sections 76 and 78 that indicate typical events and actions in the use case scenarios, while section 80 shows alternatives.

UML activity diagrams are annotated with test related annotations to generate test scripts. The test annotations, some of which are optional, determine the number of test cases to be generated and functional coverage attained by the test cases.

Each activity in the activity diagram 74 is shown as an elliptical box, which is annotated with a stereotype label, which can be either a "<<UserAction>>", "<<SystemResponse>>", or "<<Include>>". The stereotype labels indicate whether a given activity is either a user or a system activity. The stereotype labels enable the test generator to replace the activity with an entire activity diagram for the use case specified. For example, activities 82 and 84 represent user actions of "FillOutCancellationForm" and "InvokeCancellation" and hence have the stereotype label <<UserAction>> attached. Activity 86 has a <<SystemResponse>> stereotype label because it represents a system response activity "PresentEncounterInformation".

A test-designer can include test variables using a "<<define>>" stereotype label. The <<define>> stereotype label is a text-label, and it is associated with the <<UserAction>> activity where the variable originates. For example, variable definition 88 is defined using a <<define>> stereotype and is attached to the activity 82. The variable definition 88 defines variables InvalidDate, TimeFrameExpired and CancellationDateAfterEncounterStart (cancellation date predates the Encounter). These test variables will be used by the test generation phase.

The test variables specify data values and choices for decisions. In the activity model, test variables are used to refer to all kinds of data values. The definition of test variables plays an important role in the activity model. Defining test variables involves specifying where the data of this variable emerges from. A variable definition does not give any information about the data type or variable partitions but informs the test case generator where the user enters the data for this variable. Test variables are defined by notes with the stereotype "<<define>>". Each line in the note contains the name of one variable. The note is attached to the activity where the data values of these variables are derived from. The variable definition is a hint for the test generator that the user enters data at the corresponding activity that determines the value of a test variable, e.g., InvalidDate.

The variable definition is used by the test generator (TDE 34, See FIG. 2), since the generated test cases have to include instructions for the test execution tool 60 (see FIG. 2) that specify what data values to enter at which activity. Therefore, the activity model must also provide information about the type of the variable and possible values. If not explicitly specified, the default variable data type is Boolean, since it is the one most frequently used in GUI models. When the test generator finds a definition note attached to an activity, it chooses a value for each of the variables defined therein and includes this information at the corresponding step in the test case. In the example above, a Boolean value is chosen for InvalidDate by the test generator TDE 34, and the resulting value is propagated to the test execution tool 60 in the test step FilloutCancellationForm.

Transitions connect the activities. Whenever a test variable is used in a guarding condition of a transition without being defined before, it is considered as a local variable. In this case, the test design generator assumes that the value for this variable emerges in the activity right before it is used and implicitly defines the variable in that step. Use cases can access data that does not emerge in the considered use case itself, but was already given when the use case was entered. Variables can be assigned to these data values by defining these variables in the start state. These variables are referred to as predefined variables. An example of a predefined variable could be the login name of the actor of the use case. The login name is already fixed and set when the use case is entered, but the use case might use the login name to branch accordingly. A predefined variable can be used in this case by defining this variable in the start state as described above. For variables other than Boolean, the data type and value ranges have to be specified explicitly.

For the data coverage the TDE 34 uses TSL, which is based on the category-partition method. The category-partition method is a systematic procedure for decomposing system inputs (taken from the specification) into manageable pieces by identifying the key variables and values that influence the way each function of the system behaves, and defining combinations of the values that represent good test cases. A test designer specifies categories that represent major characteristics for each of the input domains of the functions of the application. Each category is then partitioned into equivalence classes of inputs called choices. All choices in categories taken together cover the input domain. TDE 34 uses this capability to generate the test data for the previously created graph coverage.

A category or partition is defined by specifying all possible data choices that it can represent. The data choices can be either data values, reference or a combination of both. The data values may be string literals representing fragments of test scripts, code or case definitions, which can later form the contents of a test case. A category determines significant values or classes of values that should make a difference in the behavior of the functional unit. These classes and values are called choices; they represent the building blocks of the test cases for the functional unit.

The choices form a partition of the category, that is, they describe how the category is divided up into pieces, or partitioned. Choices can be specific values, or sets of values, or abstract entities that are defined in terms of other categories and choices. For example, the category amount of withdrawal could include specific dollar value choices, or choices that are a range of dollar values, or expressions such as less than account balance, greater than account balance. The body of each category's definition is actually a partition. The choices of each category are the classes of the category's partition, and are listed directly in the category's definition.

Since TSL is used as a test design language and because it is based on the category-partition method, the data type and value ranges are specified by defining a partition for the variable. A partition describes the data type and also provides information to the test generator by dividing the value range into choices. Choices are often selected according to the equivalence classes of the value domain for the test cases to be most effective.

The activity 82 for filling out a cancellation form by a user for a hospital visit can result in abnormal conditions which need to be tested for. For example, such abnormal conditions can be invalid dates in the form input, the cancellation date could predate the date when the hospital visit was scheduled, etc. A test executor (whether a test user or an automatic testing tool) will need to input a valid calendar date for the patient encounter that is to be cancelled. The test designer needs to define variables for each possible outcome upon a date input. These variables are needed because the test designer has to input test date values in the test cases at this particular step to test the system's behavior when invalid dates are input.

Diamond shaped boxes in the activity diagram 74 represent the conditional flows of interactions. These conditional flow points typically include guard conditions that guide the branch selection. The branches that are not labeled with expressions can be considered as default branches in the flow. For relatively complex system, the guard conditions can be specified as expressions specified in the TSL syntax that can be recognized by the test generator. If no expressions are specified, then one branch typically evaluates to TRUE and other to FALSE.

Category-partition approach is used to support the test generation techniques, and hence test variables are partitioned into equivalence classes. An equivalence class groups test variables together and represents the choices for the category. By default, every test variable is considered a Boolean variable and hence therefore partitioned into two choices, TRUE and FALSE. For other non-Boolean type of variables, the variable ranges have to explicitly specified using a "<<partitions>>" stereotype. For example, variable 90 is labeled as "ExistingServicesProfileOption" using a <<partitions>> stereotype label, and it is used during InvokeCancellation activity. The variable 90 requires partitioning into two choices: "warning" and "error".

In another use case PrintArtifacts (see FIG. 3), it is specified that the system shall display on the screen, a prompt for the user to enter the number of receipts to be printed for a cancelled encounter. Based on data obtained from use case documentation or discussions, it is determined that the partition EnterInput includes the choices: *zero value 0, *lownumber value select (1 . . . 9), and *highnumber value 100.

While by default, the coverage criterion being applied is transition coverage; the test designer can influence the test generation process by specifying optional coverage requirements using the "<<coverage>>" stereotype in a text label. The coverage statements must be specified as TSL coverage expressions. For example, a coverage expression 92 ensures that test cases are generated to cover all combinations of the two specified variables. However, the constraint ensures that no test case is generated where the InvalidDate and TimeFrameExpired field entries are TRUE.

Any pre-conditions or post-conditions specified in the use case documentation are marked with "<<precondition>>" and "<<postcondition>>" stereotype labels in the UML activity diagram 94. Every use case can have pre- and post-conditions that need to be fulfilled before and after the use case is executed. The notes contain the pre- or post-conditions as natural language text, which is not further processed by the test generator. The conditions are copied as they are to the beginning of each test case and marked accordingly as pre- or post-conditions.

A precondition 94 and post-condition 96 are used to specify the basic requirements such as whether the user is logged into the system, etc. The test generation process does not process the specified pre-conditions and post-conditions, but includes them in the set of test cases as a prologue.

Figure 5:
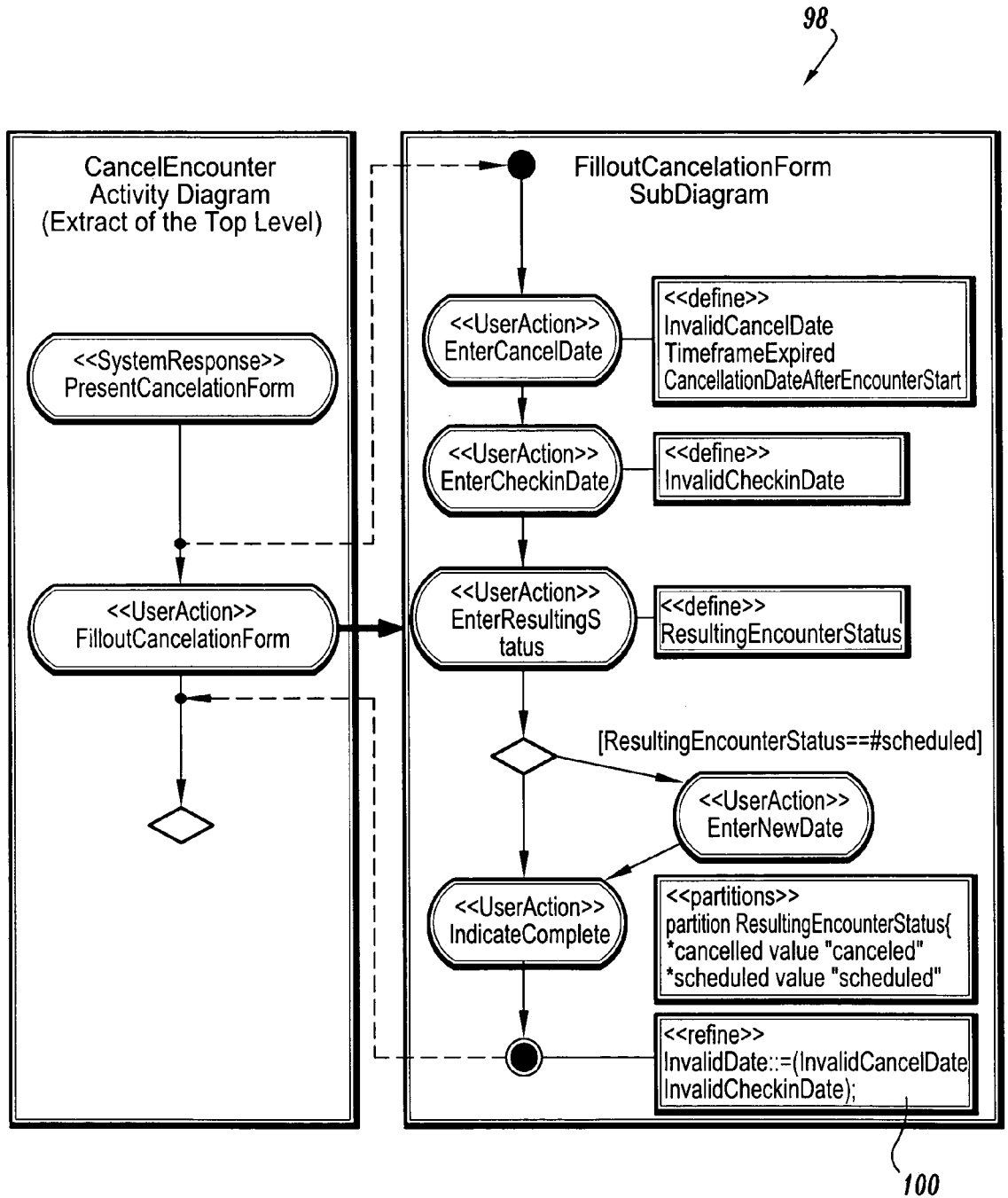
FIG. 5 illustrates a sub-diagram of an activity in an exemplary embodiment of the invention.

FIG. 5 illustrates a sub-diagram of an activity in an exemplary embodiment of the present invention. Sub-diagrams can be created for specific activities to describe such activities in further detail to a text executor or an automated test generating tool. For example, sub-diagram 98 represents details about the activity 82 that represents "FilloutCancellationForm" (See FIG. 4).

The test generation process replaces the original activity in the activity diagram with its corresponding sub-diagram, if any. Here, the sub-diagram 98, which has more details than the activity 82 in the activity diagram 74, will replace the activity 82 during the test generation process.

All variables defined by the parent activity 82 also have to be defined in the sub-diagram 98. Alternately, a system designer can use a "<<refine>>" stereotype. By using the refined variable 100, the variable InvalidDate from the activity 82 is refined in the sub-diagram. Hence, every occurrence of InvalidDate will thus be substituted by the expression InvalidCancelDate or InvalidCheckInDate during test generation.

The test designer can also control the depth of the sub-diagram expansion to a user specified depth level. By controlling the depth of iterative sub-diagram expansion, the test designer can specify generation of test cases with different degrees of abstraction from the same underlying model. Using a "<<name>>" stereotype as a test label, test designers can specify the name of the activity diagram and declare the level of abstraction as a UML property. During the test generation process, the test translator TDE 34 will not expand and process any sub-diagrams that are at a level below the declared level of abstraction.

Figure 6:
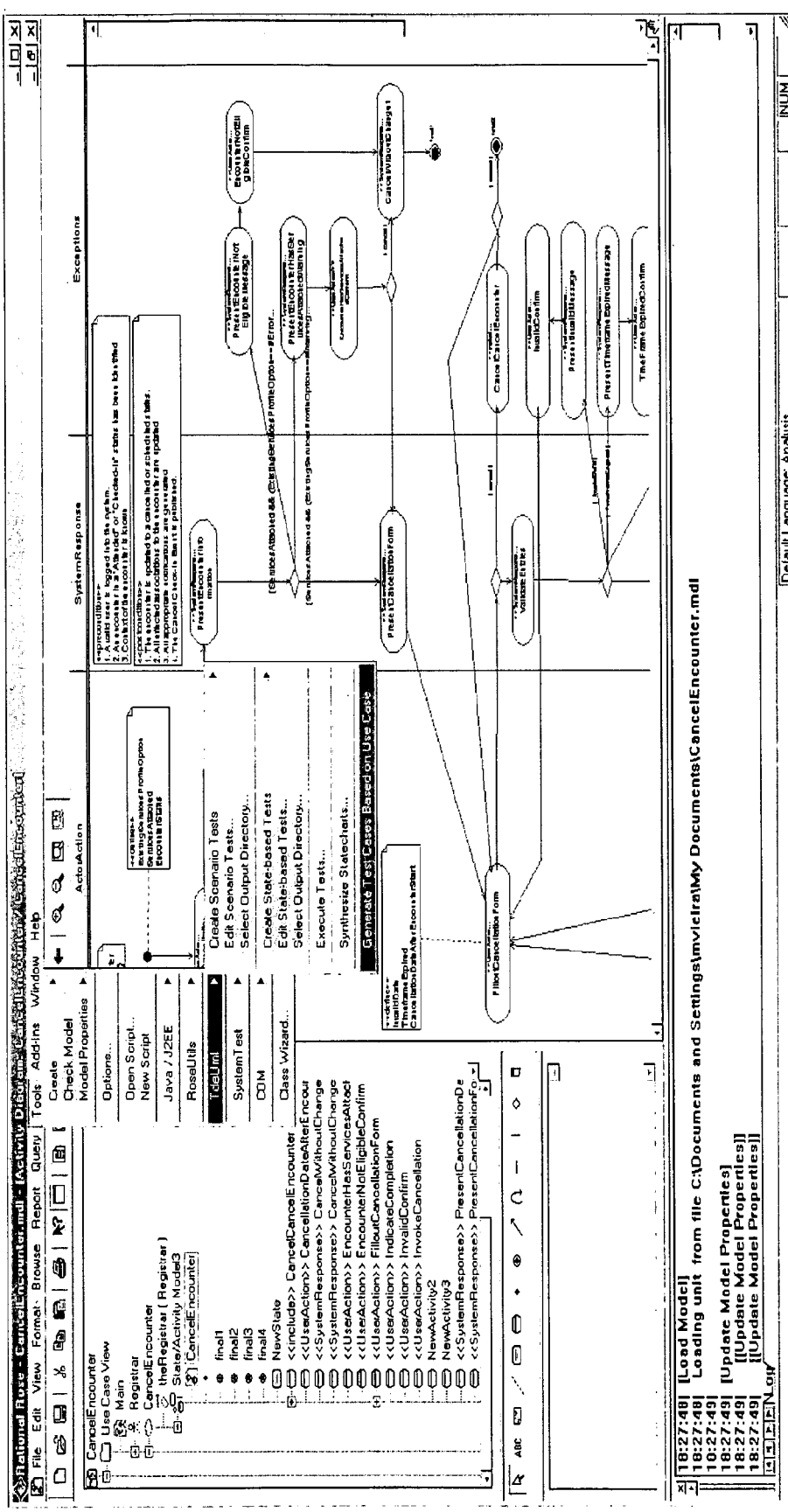
FIG. 6 is an illustrative UML editing tool in an exemplary embodiment of the invention.

FIG. 6 is an illustrative UML editing tool in an exemplary embodiment of the present invention. The activity diagrams, sub-diagrams and other diagrams described above can be modeled using the UML modeling tool 56. The UML modeling tool 56 is an illustrative tool, and any other UML modeling tool can also be used.

FIG. 7 is an illustrative textual test procedure for a test sequence in an exemplary embodiment of the present invention. The test generation process that generates the illustrative textual test procedure is described next. Conformance tests are generated to ensure compliance of the system specification with the resulting implementation. For the conformance tests to be useful, it is assumed that the implementation behaves in a deterministic and externally controllable manner.

The Test Development Environment (TDE) 34 (See FIG. 2) processes a test design specified using the TSL. The TSL is based on a category-partition technique, which identifies behavioral equivalence classes within the structure of a system under test.

A TSL test design is created from the activity diagram 84 (See FIG. 4) by mapping its activities and transitions to TSL partitions and choices. The control flow in the activity diagram is totally determined by the diagram variables. These variables represent the various user inputs and the part of system state that is relevant for a particular use case. Thus, every test case is defined by choosing values for all the variables in the diagram.

For the category-partition method, every variable has to be mapped to a partition, which divides the value range of the variable according to its equivalence classes. Besides variable partitions, a partition is created for every activity and choice within the partition for every outgoing transition.

TDE 34's generation of the testing scripts is described next. A recursive, directed graph is built by the TDE 34 that has a root category/partition and contains all the different paths of choices to plain data choices. This graph may contain cycles depending on the choice definitions and is equivalent to the graph of the global state machine. A test frame, that is, test case is one instance of the initial data category or partition, that is, one possible path from the root to a leaf of the (potentially infinite) reachability tree for the graph.

An instantiation of a category or partition is a random selection of a choice from the possible set of choices defined for that category/partition. In the case of a category, the same choice is selected for every instance of a test frame. This restricts the branching possibilities of the graph. With a partition, however, a new choice is selected at random with every new instantiation. This allows full branching within the graph and significantly influences test data generation. The contents of a test case consist of all data values associated with the edges along a path in the graph.

The TSL language provides two types of coverage requirements. First, Generative requirements control which test cases are instantiated. If no generative test requirements are defined, no test frames are created. For example, coverage statements can be defined for categories, partitions and choices. Second, constraining requirements cause the TDE 34 to omit certain generated test cases. For example, there are maximum coverage definitions, rule-based constraints for category/partition instantiation combinations, instantiation preconditions and instantiation depth limitations. Such test requirements can be defined globally within a TSL test design or attached to individual categories, partitions or choices. The TDE creates test cases in order to satisfy all specified coverage requirements. By default, the coverage criterion is that all transitions within an activity diagram must be traversed at least once.

Included use cases represent related use cases and their associated activity diagrams, for example, PrintArtifacts and ValidateEncounterDates (See FIG. 3). These must be incorporated into the test generation process for the CancelEncounter diagram (See FIG. 4). This is achieved in a manner similar to the processing of sub-diagrams as described above, but since the included use cases may themselves contain further use cases and so forth, this could potentially lead to a large number of test cases being generated, given the above default coverage criterion. Also, covering the branches for a set of included use cases is not mandatory, since it is assumed that separate sets of test cases will be generated for them.

The test generator TDE 34 in its default behavior only expands the typical success scenario in the use cases to avoid large number of test cases being generated. However, it is possible to modify this behavior to enable test designers to generate test cases to traverse the branches of the target activity diagram and those of its included use cases. Also, the test designer can limit the level of use case inclusion as described above in the context of sub-diagramming.

The output of the test generator is a set of XML-based files that can be formatted for presentation as a set of textual test procedures or executable test scripts based on the XSL style sheet being used. One such textual test procedure 102 for one test sequence of the CancelEncounter activity diagram 74 (See FIG. 4) is shown. The test procedure 102 includes choices as well as user actions (required inputs) and system outputs (expected responses). The test procedure 102 also contains a description of the pre- and post-conditions that the system needs to be in before the start and after the end of the test.

Choices can be used to define initial state of the system before testing and also to influence test case execution. In the context of FIG. 4, the choices influence the execution time of the main success scenario until the ValidateEntries activity. Then, an alternative path through the PresentTimeFrameExpiredMessage activity is chosen as the variable Time frame Expired is TRUE. Now, the flow returns to the main success scenario in the PromptVerifyCompletion activity and so forth until it finally completes the verification when canceling a patient encounter.

The FilloutCancellationForm activity, shown in a section 104, is represented by its refinement in the FIG. 5 sub-diagram. The main success scenario sequence for use cases, Validate_Encounter_Dates and PrintArtifacts, are not explicitly described in a section 106, yet the use case UpdateEncounter is described as a sequence of outputs in a section 108, which are expected system responses after an encounter is cancelled.

FIG. 8 shows an illustrative generated test script with calls to the individual test step functions in an exemplary embodiment of the present invention. In a generated test script 110, the individual test and verification steps have been codified using the scripting language of the capture/replay tool (not shown) as TestStep( ) and VerifyStep( ) functions. The function TestStep( ) simulates the user action, and the function VerifyStep( ) verifies whether the system response is consistent with what is specified.

The choices, that is, the data values used to initialize the context for the test are supplied via the SetTestParm( ) function. For example, in order for the generated test case to be able to cancel an encounter, a specific encounter first needs to exist. Using the choices, EncounterStatus and ServicesAttached, a specific encounter from the test database is recalled that can then be cancelled during the execution of the test case. Those choices ensure that the encounter is classified as 'attended' and cannot have services 'attached' to it.

In at least one embodiment of the present invention, the test designer can start with the capture of a representative set of test scripts using a User Interface (UI) capture and replay tool. Individual test steps are recorded, where each test step corresponds to a user activity in the activity diagram (See FIG. 4). Steps need to be recorded until all transitions in the activity diagram have been traversed.

While path verification is being handled in each test step by checking that the proper graphical window is being displayed, additional data verification test steps may need to be created in order to check that the data fields contain correct values. Alternatively, the verification may be performed as part of the original set of test steps. Some test tools allow the capture of so-called "checkpoints" that can refer to this data. Other tools only capture the data on the screen and require data verification to be performed programmatically by the test executor.

In case of three-tiered applications (i.e., a client-server architecture in which the user interface, functional process logic ("business rules") and data storage and access are developed and maintained as independent modules, most often on separate platforms) database verification needs to be performed at the end of a specific test sequence. Typically, a set of additional steps is recorded via the GUI in which the data on the screens is checked, while at times separate verification script needs to be called.

A test designer/executor may wish to either just maintain the representative set of test scripts and model or enhance the existing set of test scripts by recording additional scripts, which vary only in the data values being entered application's input fields. Alternately, the test executor can create a library of test snippets from the above representative set of test scripts to allow the test generator to automatically create those additional tests. Individual test steps need to be refined—generalized or parameterized—so that they are independently callable from an automatically generated test script and driven using their arguments or the data structures that reference those arguments. Further, the test designer/executor can customize the XSL stylesheets for the test generator to generate the executable test scripts.

Testing GUI applications automatically can make script maintenance difficult when the underlying application logic or GUI layouts change. Often the same test step is captured in several different contexts and thus must be maintained in all of them. At times paths change and a whole sequence of test steps needs to be identified and captured.

If the test execution tool 60 (See FIG. 2) has maintained the representative set of test scripts, models and added test scripts containing data variations, then depending on the type of change to the application, the test designer would need to update the models and can at least regenerate the textual test procedures for the test execution tool 60. Some of these test procedures would map to existing test scripts, but the test executor would have to perform a manual comparison. In other cases, scripts would have to be updated by the test executor with entire new test sequences.

For some changes, the test designer would similarly update the models, but instead be able to regenerate the executable test scripts, requiring minimal intervention from the test executor. Other types of changes would only require new test steps rather than entire new sequences to be recorded and parameterized.

Figure 9:
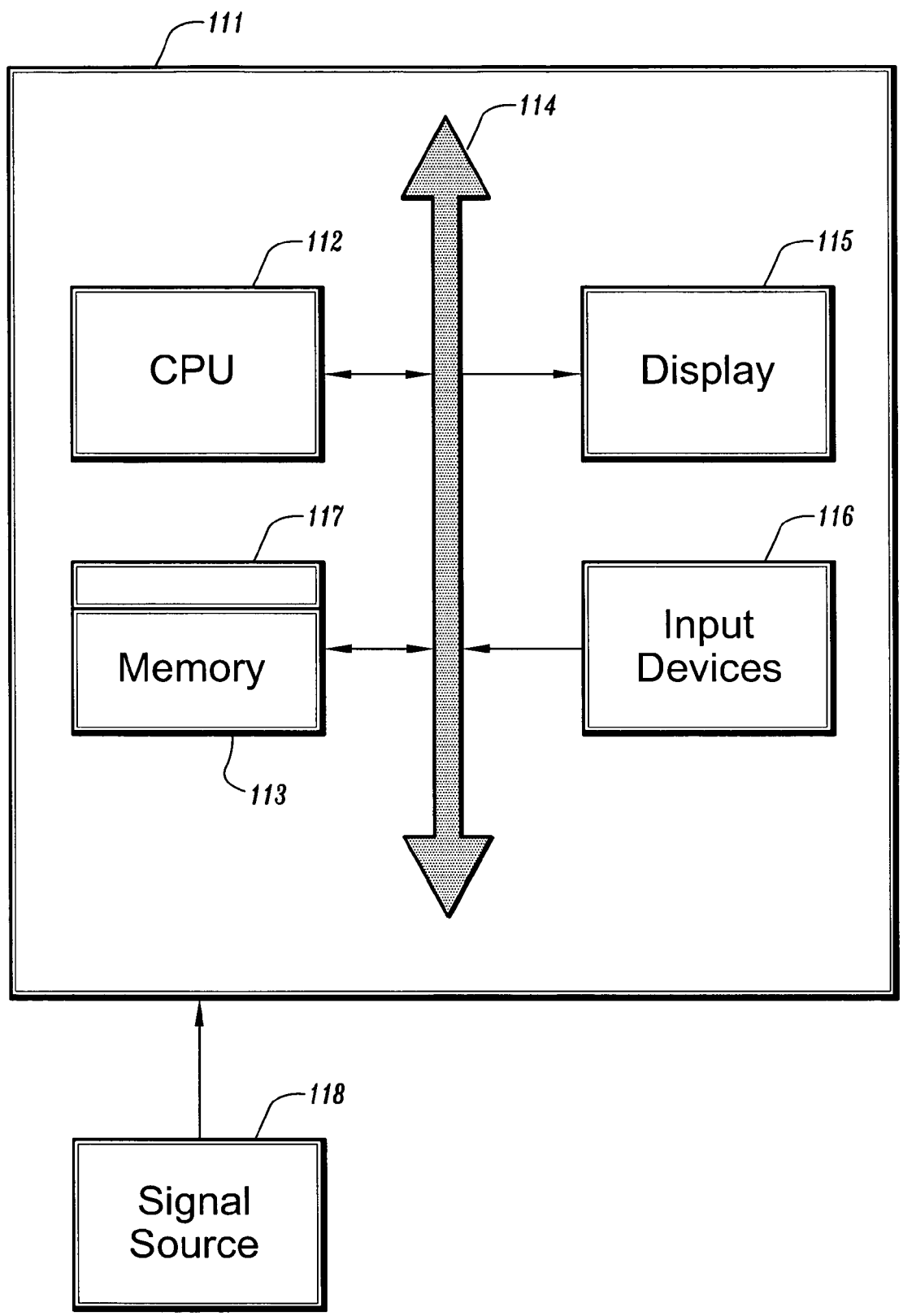
FIG. 9 is an exemplary computer system used to implement an exemplary embodiment of the present invention.

Referring to FIG. 9, according to an exemplary embodiment of the present invention, a computer system 111 for implementing the invention can comprise, inter alia, a Central Processing Unit (CPU) 112, a memory 113 and an Input/Output (I/O) interface 114. The computer system 111 is generally coupled through the I/O interface 114 to a display 115 and various input devices 116 such as a mouse and keyboard. The support circuits can include circuits such as cache, power supplies, clock circuits, and a communications bus. The memory 113 can include random access memory (RAM), read only memory (ROM), disk drive, tape drive, etc., or a combination thereof. An exemplary embodiment of the invention can be implemented as a routine 117 that is stored in memory 113 and executed by the CPU 112 to process the signal from the signal source 118. As such, the computer system 111 is a general purpose computer system that becomes a specific purpose computer system when executing the routine 117 of the present invention in an exemplary embodiment of the invention.

The computer platform 111 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed in an exemplary embodiment of the invention. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for testing software applications, comprising:
generating a behavioral model of a software application;
generating a test design for the software application from the behavioral model; and
executing the test design on the software application,
wherein the step of generating the behavioral model comprises:
designing a use case to define functionalities of the software application;
building an activity diagram for the use case, wherein the activity diagram includes a plurality of activities, wherein each activity is an execution of a task whether it be a physical activity or an execution of code and wherein the activity diagram shows a sequence of the activities;
adding test annotations to the activities, wherein at least one of the test annotations indicates whether the activity to which it has been added is either a user or system activity; and
combining the test annotations with the activities to generate an annotated activity diagram.

2. The method of claim 1, wherein the use case is modeled in Unified Modeling Language (UML).

3. The method of claim 2, wherein the activity diagram comprises a UML activity diagram.

4. The method of claim 1, wherein the step of generating the test design comprises:
reading the activities and the test annotations in the annotated activity diagram to generate intermediate object representations;
converting the intermediate object representations to create an intermediate object model;
generating test specification language (TSL) scripts from the intermediate object model;
forming a test design from the TSL scripts; and
creating test scripts in a descriptive form from the test design.

5. The method of claim 4, wherein the descriptive form is extensible Markup Language (XML).

6. The method of claim 4, wherein the step of executing the test design comprises:
translating an output of the descriptive form test scripts executed by a tester to an output format.

7. The method of claim 1, wherein the at least one test annotation enables a test generator to replace the activity to which the at least one test annotation has been added with an activity diagram for part of the use case specified by the replaced activity.

8. A system for testing software applications, comprising:
a memory device for storing a program;
a processor in communication with the memory device, the processor operative with the program to:
generate a behavioral model of a software application;
generate a test design for the software application from the behavioral model; and
execute the test design on the software application,
wherein the processor is operative with the program when generating the behavioral model to:
design a use case to define functionalities of the software application;
build an activity diagram for the use case, wherein the activity diagram includes a plurality of activities, wherein each activity is an execution of a task whether it be a physical activity or an execution of code and wherein the activity diagram shows a sequence of the activities;
add test annotations to the activities, wherein at least one of the test annotations indicates whether the activity to which it has been added is either a user or system activity; and
combine the test annotations with the activities to generate an annotated activity diagram.

9. The system of claim 8, wherein the use case is modeled in Unified Modeling Language (UML).

10. The system of claim 9, wherein the activity diagram comprises a UML activity diagram.

11. The system of claim 8, wherein the processor is operative with the program when generating the test design to:
read the activities and the test annotations in the annotated activity diagram to generate intermediate object representations;
convert the intermediate object representations to create an intermediate object model;
generate test specification language (TSL) scripts from the intermediate object model;
form a test design from the TSL scripts; and
create test scripts in a descriptive form from the test design.

12. The system of claim 11, wherein the descriptive form is extensible Markup Language (XML).

13. The system of claim 11, wherein the processor is operative with the program when executing the test design to:
translate an output of the descriptive form test scripts executed by a tester to an output format.

14. A program storage device readable by machine, storing a program of instructions executable by a processor to perform method steps for testing software applications, the method steps comprising:
generating a behavioral model of a software application;
generating a test design for the software application from the behavioral model; and
executing the test design on the software application,
wherein the step of generating the behavioral model comprises:
designing a use case to define functionalities of the software application;
building an activity diagram for the use case, wherein the activity diagram includes a plurality of activities, wherein each activity is an execution of a task whether it be a physical activity or an execution of code and wherein the activity diagram shows a sequence of the activities;
adding test annotations to the activities, wherein at least one of the test annotations indicates whether the activity to which it has been added is either a user or system activity; and
combining the test annotations with the activities to generate an annotated activity diagram.

15. The program storage device of claim 14, wherein the use case is modeled in Unified Modeling Language (UML).

16. The program storage device of claim 15, wherein the activity diagram comprises a UML activity diagram.

17. The program storage device of claim 14, wherein the step of generating the test design comprises:
  reading the activities and the test annotations in the annotated activity diagram to generate intermediate object representations;
  converting the intermediate object representations to create an intermediate object model;
  generating test specification language (TSL) scripts from the intermediate object model;
  forming a test design from the TSL scripts; and
  creating test scripts in a descriptive form from the test design.

18. The program storage device of claim 17, wherein the descriptive form is extensible Markup Language (XML).

19. The program storage device of claim 17, wherein the step of executing the test design comprises:
  translating an output of the descriptive form test scripts executed by a tester to an output format.

* * * * *